United States Patent [19]

Jones et al.

[11] Patent Number: 5,363,483
[45] Date of Patent: Nov. 8, 1994

[54] UPDATING OBJECTS DISPLAYED IN A COMPUTER SYSTEM

[75] Inventors: Stephen K. Jones, Norwood; Joseph J. Rzepiejewski, N. Attleboro; Paul J. Vanslette, Blackstone, all of Mass.

[73] Assignee: Intellution, Inc., Norwood, Mass.

[21] Appl. No.: 967,777

[22] Filed: Oct. 28, 1992

[51] Int. Cl.⁵ .............................................. G06F 15/62
[52] U.S. Cl. ..................................... 395/161; 395/133
[58] Field of Search ............... 395/133, 134, 135, 153, 395/157, 161

[56] References Cited

U.S. PATENT DOCUMENTS

| | | | |
|---|---|---|---|
| 4,317,114 | 2/1982 | Walker | 340/721 |
| 4,814,755 | 3/1989 | Johnson et al. | 395/134 |
| 4,888,584 | 12/1989 | Ando et al. | 340/747 |
| 4,893,120 | 1/1990 | Doering et al. | 341/31 |
| 4,935,730 | 6/1990 | Kosuka | 340/723 |
| 4,951,229 | 8/1990 | DiNicola et al. | 395/152 |
| 4,974,174 | 11/1990 | Kleinman | 395/133 |
| 5,072,409 | 12/1991 | Bottorf et al. | 395/137 |
| 5,077,678 | 12/1991 | Guttag et al. | 395/157 |
| 5,134,697 | 7/1992 | Scheffler | 395/425 |
| 5,202,671 | 4/1993 | Aranda et al. | 395/157 |
| 5,216,413 | 6/1993 | Seiler et al. | 340/721 |

*Primary Examiner*—Heather R. Herndon
*Assistant Examiner*—N. Kenneth Barraston
*Attorney, Agent, or Firm*—Fish & Richardson

[57] ABSTRACT

A computer display system and technique in which display area is represented as an array of regions, and a record is maintained for each object displayed in the area to identify the regions occupied by the object. When an event occurs that causes a change in the information presented in the display area, the regions that are affected by the change are detected, and an object is updated if its record identifies at least one of the affected regions. Examples of such events include the appearance and removal of dialog boxes, pull-down menus, and other items that may obscure the objects when displayed, and changes in the display characteristics (e.g., color) of the objects.

14 Claims, 10 Drawing Sheets

Microfiche Appendix Included
(2 Microfiche, 102 Pages)

UPDATING OBJECTS DISPLAYED IN A COMPUTER SYSTEM

This application includes a microfiche appendix (2 microfiche, 102 frames) of the source code appendix discussed in the specification.

BACKGROUND OF THE INVENTION

This invention relates to computer systems for displaying graphical objects.

Graphical computer display systems typically create images on a display device (e.g., a CRT or other display screen) by building the images as a mosaic of simple graphical objects such as rectangles, circles, and triangles. Portions of the image that become obscured, for example, by a dialog box, pull-down menu, or other item must be redrawn on the screen when the obscuring item is removed. In some systems, this is done through the use of so-called backing store, in which pixels that are obscured are temporarily saved and are redrawn on the display when the obscuring item is removed. Backing store is of little use, however, when the objects change position or display characteristics dynamically, because the saved pixel values may have become obsolete by the time that the obscuring item is removed.

One technique for determining which objects to redraw is to detect which objects intersect the obscuring item, and redraw only those objects. This is typically done by passing to all objects in the image a set of coordinates that define a rectangle that encloses the obscuring item. Each object determines whether it is located within this rectangle by intersecting its bounding rectangle (i.e., a polygon that encloses the object) with the rectangle of the obscuring item. Objects finding themselves within any portion of the obscuring rectangle of the item are redrawn.

The intersection procedure is generally performed by determining the locations of the edges (left, right, top, and bottom) of the object's rectangle, and comparing them with the positions of the corresponding edges of the obscuring rectangle. The relative positions of the edges determine whether the object is within the obscuring rectangle. Generally, 6–8 edge comparisons are needed to make this determination.

SUMMARY OF THE INVENTION

In one general aspect of this invention, the computer display area is represented as an array of regions, and a record is maintained for each object displayed in the area to identify the regions occupied by the object; when an event occurs that causes a change in the information presented in the display area, the regions that are affected by the change are detected, and an object is updated if its record identifies at least one of the affected regions.

Among other advantages, this technique eliminates the need to perform rectangle intersection procedures, thereby substantially reducing the time needed to determine which objects need to be redrawn in response to events such as the appearance and removal of obscuring items such as dialog boxes and pull-down menus, and changes in the display characteristics (e.g., color) of the objects. This substantially reduces the time needed to redraw the objects. As a result, even complex images that compose large numbers of objects are redrawn rapidly and efficiently.

Preferred embodiments include the following features.

Each record includes a plurality of entries which each correspond to one of the regions. The state of the entry (e.g., a logic "0" or "1") indicates whether the object occupies the region to which the entry corresponds. In a preferred embodiment, a logic "1" in an entry indicates that the object occupies the corresponding region. The record for each object is updated when the position of the object in the display area is changed, for example, when the object changes size, orientation, or location.

An event record is established when a display event occurs, and each entry in the event record has a state that indicates whether the region to which the entry corresponds is an affected region. The entries of each object's record are compared with corresponding entries of the event record to determine whether the object occupies an affected region. The records are compared by performing a logic AND operation on the states of the corresponding entries. The AND operation is performed on all entries in one step, thereby further reducing the time needed to identify the objects that should be updated. If the comparison reveals that the logic "1" entries of the object's record match at least one logic "1" entry of the event record, the object is updated.

An object is updated in response to a display event by drawing the object into an offscreen memory rather than to the display area itself. The offscreen memory includes a storage area that is partitioned into regions corresponding to the array of regions in the display area. The data that represents an object being updated are written into the regions of the offscreen memory that correspond to the regions of the display area in which the object resides. Only the data that is stored in the regions of offscreen memory that correspond to the affected regions (as identified by the event record) are transferred from offscreen memory to the display area. As a result, only the portions of the display area that require updating (i.e., the affected regions) are redrawn, thereby further reducing the update time.

The data that is transferred from offscreen memory to the display area is obtained in a single call to the offscreen memory. One or more clipping regions are constructed based on the event record to cause only the data that is to be displayed in the affected regions to actually be transferred to the display. Obtaining all of the data in a single call reduces the data transfer time. The clipping regions serve as a "stencil" that allows only the portion of the object that resides in an affected region to be redrawn in the display area.

Multiple display areas (e.g., so called "windows") may be maintained on the display device, and the invention is used to control the updating of objects in each display area in the same manner as discussed above. A display event that causes a change in the information presented in any display area, is responded to by detecting the regions of that area that are affected by the change, and objects are updated if their records identify at least one of the affected regions.

The invention provides a fast and efficient technique for updating the states of multiple objects displayed in one or more windows that imposes a small overhead cost on the computer display system. The invention thus provides powerful graphical display tool that is particularly useful in systems (such as process control systems) that display graphical objects having dynamic properties (e.,g., color and position).

Other features and advantages of the invention will become apparent from the following detailed description, and from the claims.

DESCRIPTION OF THE PREFERRED EMBODIMENT

Figure 1:
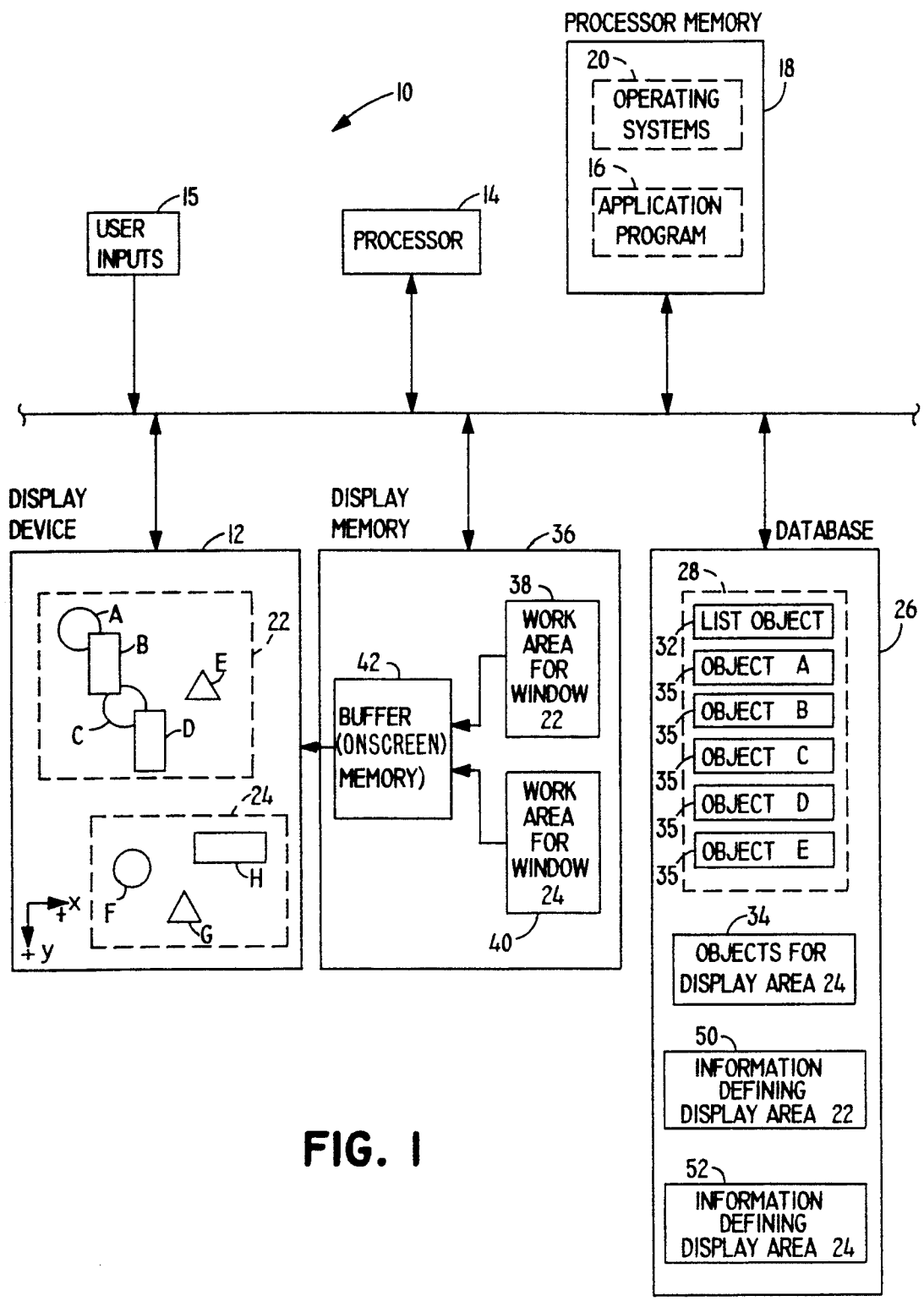
FIG. 1 is a block diagram of a computer system.

Referring to FIG. 1, a computer system 10 for displaying objects and other information on a display device 12 includes a processor 14 which executes one or more applications programs 16 stored in a processor memory 18. Processor 14 uses a windows-based operating system 20 (such as Windows 3.1 from Microsoft Corporation) to enable the application program 16 executed by processor 14 to support and maintain multiple display areas 22, 24 (i.e., windows) on display device 12. (Although two tiled windows are shown, the windows may overlap each other, and more or fewer display areas 22, 24 may be supported.) The user of computer system 10 interacts with processor 14 to control the execution state of applications program 16 using various inputs 15 (e.g., a keyboard, mouse, or other suitable devices).

Processor 14 constructs and maintains graphical data objects as it executes application program 16, and draws the graphical objects on display device 12 in display areas 22, 24 as dictated by application program 16. For example, graphical objects A, B, C, D, and E are displayed in area 22, while area 24 displays objects F, G, and H. Objects A–H are shown as simple geometrical shapes such as circles, rectangles, and triangles for ease of illustrating the invention. It will be understood that typically a display area 22, 24 will contain many more graphical data objects arranged to convey an image to the user.

Objects A–H are maintained as data structures in a database 26. Data structures 30 for the objects displayed in area 22 (i.e., objects A–E) are stored in area 28 together with a list object 32 that holds information about the manner in which objects A–E are displayed (e.g., the order in which the objects are to be drawn in display area 22). List object data structure 32 is linked to each graphical object data structure 30 for purposes to be described. A similar area 34 of database 26 stores data structures and a list object for objects F–H displayed in area 24.

Each graphical object data structure 30 holds the data necessary to render the object on device 12. For example, data structures 30 each include data that define the x-y coordinates of the corresponding data object in area 22 (thereby uniquely identifying the location and shape of the object) and other display characteristics of the object (e.g., its color). Data objects A–H are dynamic—that is, the data that define the objects changes over time. One example of such dynamically changing data is data produced during the operation of a process control system of the kind described in copending patent application Ser. No. 07/366,740, filed on Jun. 15, 1989, now U.S. Pat. No. 5,179,701, assigned to the present assignee, and incorporated herein by reference (hereinafter, the "'740 application"). As described in the '740 application, data gathered sensors and other devices in the process control system is stored in a real-time database (not shown) is transferred to database 26 (either periodically or at the request of processor 14) and assembled in data objects 30 for display.

Processor 14 transfers data objects A–H from database 26 to display device 12 via display memory 36. Display memory 36 includes a buffer 42 (an onscreen memory called the "screen device context") that stores, pixel-by-pixel, the data that represents the current display state of display device 12. That is, buffer 42 holds the pixel data for objects A–E in display area 22 as well as the pixel data for objects F–H in display area 24. In addition, display memory 36 includes a work area 38 (an offscreen memory called "the offscreen memory device context") for window 22, and a similar work area 40 for display area 24. As discussed in detail below, objects A–E are redrawn into work area 38 in response to a change in the information shown on display 12 (this is called a "display event"); likewise objects F–H are redrawn into work area 40 in response to a display event.

Figure 2:
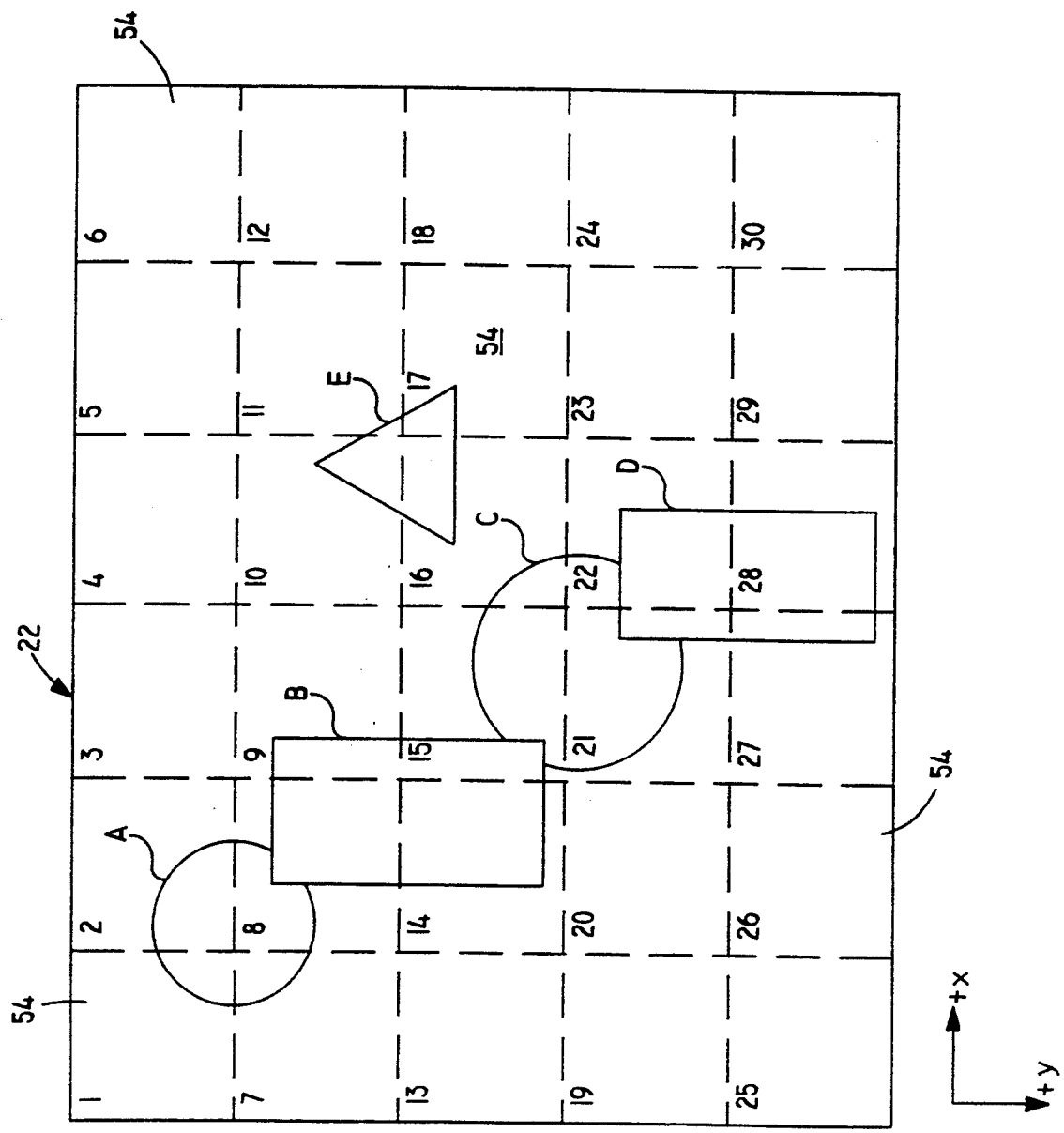
FIG. 2 illustrates a display area of a display device in the computer system of FIG. 1, partitioned into an array of discrete regions according to the invention.

Referring also to FIG. 2, when display areas 22, 24 are established during the execution of application program 16, data structures 50, 52 (FIG. 5), that define the x-y locations and boundaries of display areas 22, 24 are created in database 26. In addition, processor 14 partitions each display area into an array of thirty discrete regions 54. Display area 22, shown in FIG. 2, is subdivided into a 6×5 array of rectangular regions 54 numbered 1–30. Regions 54 are of equal size, and the number of pixels in each region 54 is a function of the size of display area 22, 24. The boundaries of regions 54 for display areas 22, 24 are maintained in window data structures 50, 52, as described below. Window data structures 50, 52 are accessible by application program 16 and the data structures 30 (FIG. 5) of the objects displayed in the display area 22, 24 to which data structures 50, 52 correspond for reasons that will become apparent.

Figure 3:
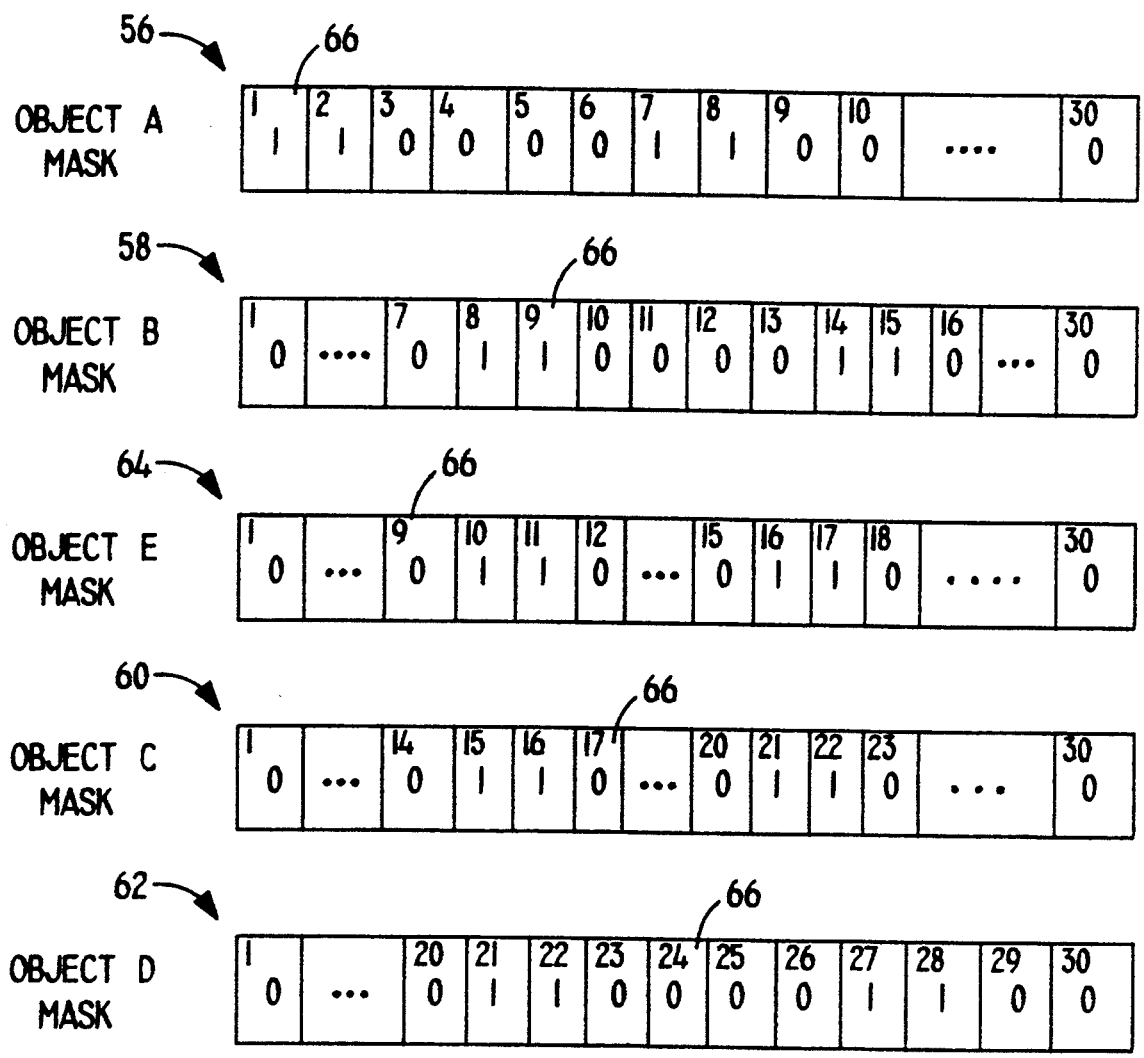
FIG. 3 depicts records (e.g., bit masks) constructed for objects displayed in the display area of FIG. 2.

Referring also to FIG. 3, each object data structure 30 maintains a record of entries called a bit mask that is established when the object is created. Bit masks 56, 58, 60, 62, 64 for objects A–E are shown in FIG. 2. The entries 66 of each bit mask 56–64 respectively correspond to the regions 54 of the display area 22, 24 in which the object represented by the bit mask resides.

That is, entries 66 of bit masks 56–64 correspond to regions 54 of display area 22. Each bit mask entry 66 contains a single bit, the state of which indicates whether the object A–H represented by the bit mask occupies the display region 54 to which the bit corresponds. For example, object A is present in regions 1, 2, 7, and 8 of display area 22, and thus bits 1, 2, 7, and 8 of bit mask 56 are set to a logic "1" with the remaining bits (3–6 and 9–30) are in a logic "0" state (the opposite convention can be used, if desired).

Likewise, entries 8, 9, 14, and 15 of bit mask 58 are set to a logic "1" state to indicate that object B is displayed in regions 8, 9, 14, and 15 of display area 22. Similarly, because object C is in regions 15, 16, 21, and 23 of display area 22, these entries of bit mask 60 are set to a logic "1" state. Completing the example, logic "1"s are present in entries 21, 22, 27, and 28 of bit mask 62 and entries 10, 11, 16, and 17 of bit mask 64 to indicate that objects D and E respectively reside in these regions 54 of display area 22.

Each object A–E is responsible for maintaining its own bit mask 56–64 and updating the mask when the size or position of the object in display area 22 is changed (the same is, of course, true for all other displayed objects F–H). For example, if object A is made smaller or repositioned to occupy only region 1, bit mask 56 is modified to include a logic "1" only in entry 1. Conversely, if, e.g., object A doubles in size to occupy regions 1–3, 7–9, and 13–15, then all of these entries of mask 56 will become set to a logic "1" state.

As described in detail below, partitioning each display area 22, 24 into regions 54 and maintaining bit masks 56–64 for each displayed object greatly facilitates and speeds the task of redrawing objects A–H in response to events that dictate that the display be changed.

Figure 4:
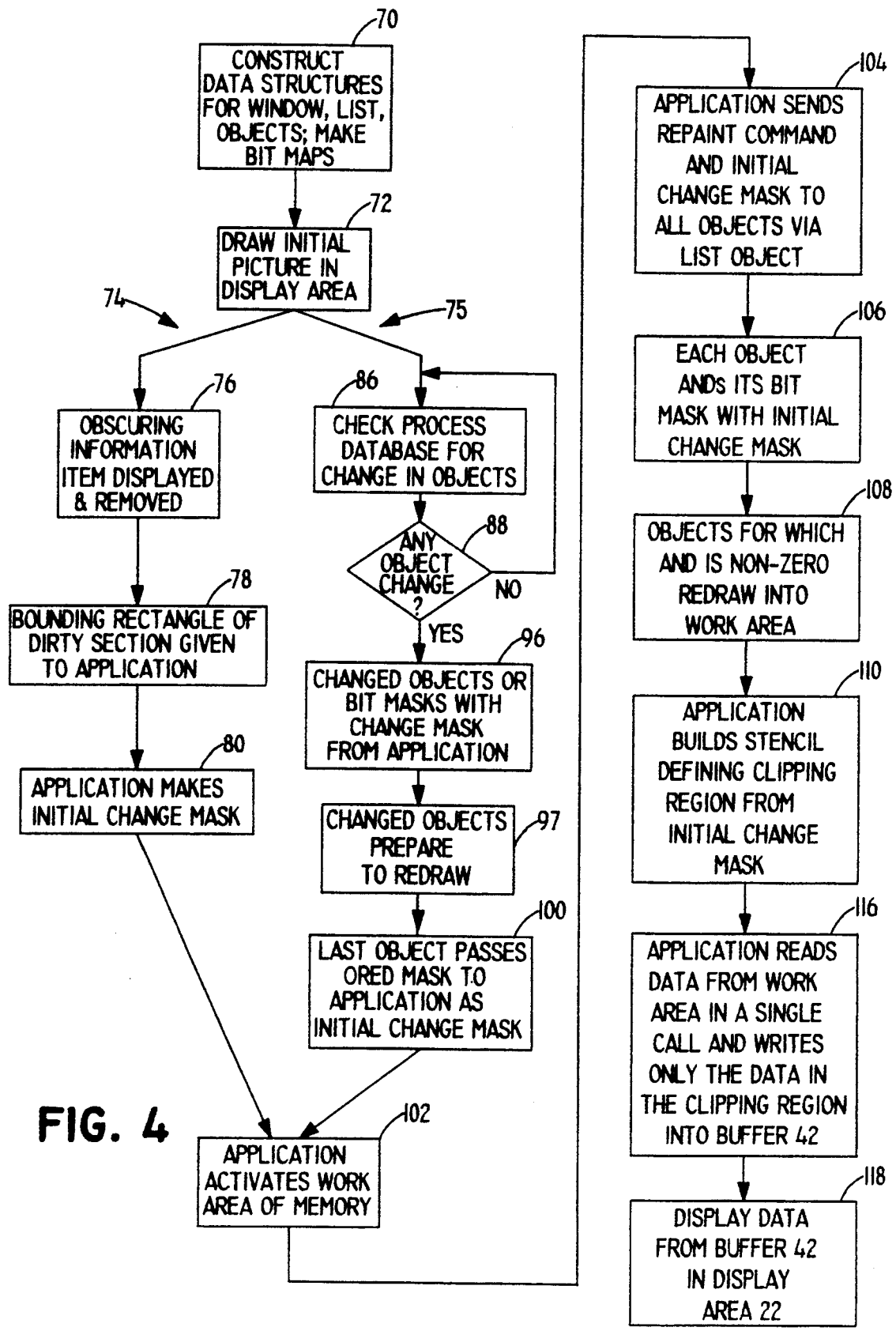
FIG. 4 is a flow chart that shows procedures for updating displayed objects according to the invention.

Referring also to FIG. 4, in operation, processor 14 prepares to draw a picture containing objects A–E in display area 22 as requested by the user or as dictated by the flow of application program 16 by initially establishing window data structure 50, list object data structure 32, and object data structures 30 for objects A–E. The bit masks 56–64 for objects A–E are also created and inserted in object data structures 30 (step 70). (The remainder of this discussion shall focus on display area 22 and objects A–E, it being understood that the same procedure is followed for display area 24 and objects F–H.) The initial picture containing objects A–E is then drawn (step 72).

Figure 5:
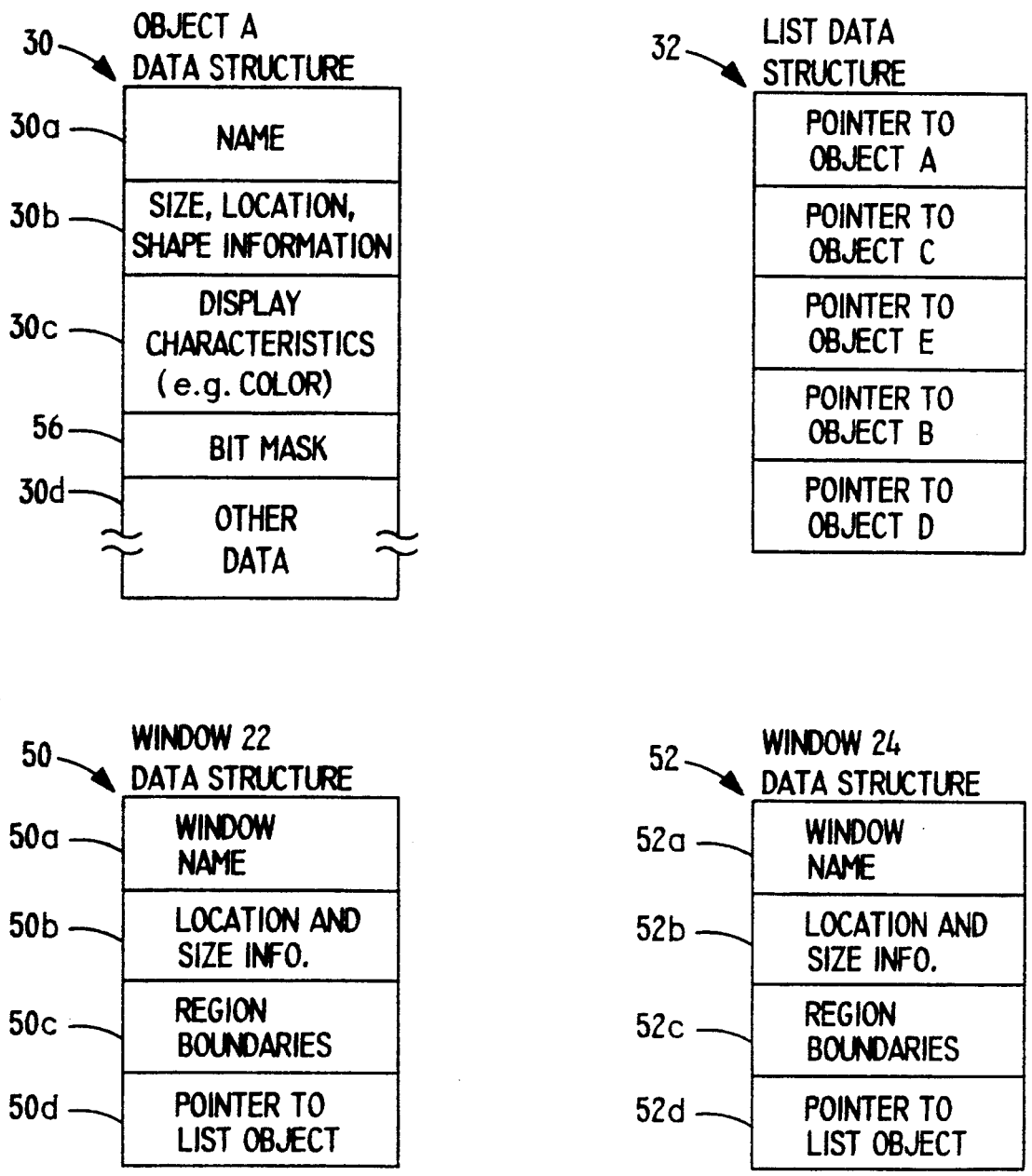
FIG. 5 depicts data structures useful in understanding the invention.

FIG. 5 shows representative data structures 30, 32, 50, and 52 in more detail. Window data structure 50 includes a field 50a that identifies the window by name, and a field 50b that defines the location and size of display area 22 on the screen of display device 12. The boundaries (and thus locations) of the thirty regions 54 of display area 22 are defined by data stored in field 50c. Field 50d includes a pointer to list object 32. (Data structure 52 includes similar fields 52a–52d that define display area 24.)

The information in window data structure 50 is used to complete each object data structure 30 for objects A–E. The name of the object (in this example, object A) is stored in field 30a, and information that defines the shape (i.e., circular), coordinates (e.g. the x–y position of the circle in display area 22), and size (e.g., ½ inch radius) of object A is placed in field 30b. The information in field 30b and window data structure 50 is used to construct bit mask 56, which constitutes another field of object A data structure 30. Other display characteristics (e.g., color) are located in field 30c, and other data for the object (e.g., dynamic properties such as fill level) reside in field 30d.

Application program 16 constructs list data structure 32 to keep track of the objects A–E that are displayed in area 22 and the order in which objects A–E appear stacked on the display. Data structure 32 stores pointers to the data structures 30 of objects A–E in the order in which objects A–E are rendered in display area 22. For example, the order of pointers in list object 32 indicates that the objects are rendered in the following order: A, C, E, B, D.

Referring again to FIG. 4, each object A–E builds its bit mask 56–62 as it is established by processor 14 (step 70). In addition, objects A–E update their bit masks 56–62 when necessary to reflect a change in the position or size of object in display area 22.

After the initial picture of objects A–E is drawn in display area 12, events often occur during processing that cause the display of information on device 12 to change. Two such events are represented by branches 74, 75 of the flow chart of FIG. 4.

One event 74 is the display and subsequent removal of an item of information 77 that obscures one or more objects A–E when the item is shown on the display screen (step 76). Examples of such obscuring information items include dialog boxes and pull-down menus that are supported by operating system 20 and are activated and removed by the user via interface 15. Another event 75 is a change in the display of one or more objects A–E (e.g., in response to changes in the data for the objects in the real time database).

Figure 6:
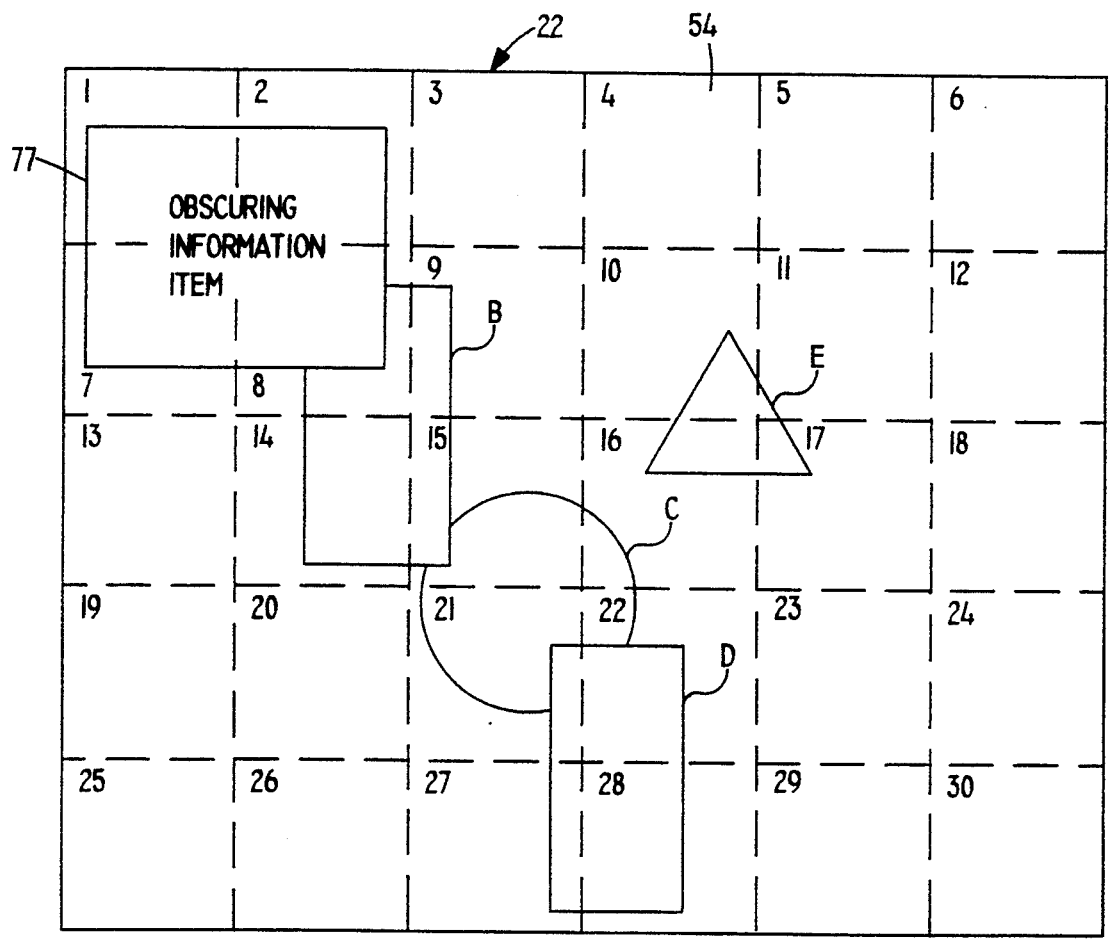
FIG. 6 represents one type of display event that triggers updating of displayed objects in the invention.

Referring also to FIG. 6, information item 77 is displayed in regions 1, 2, 7, and 8 of display area 22, completely obscures object A, and partially covers object B. Because, as discussed, graphical display objects are dynamic and may change their display characteristics and position during operation, when item 77 is removed the display characteristics of formerly-obscured objects A and B may be different from when item 77 was created. For example, objects A and B may have changed color (e.g., from green to red) in response to changes in the real time data in the process database to indicate an alarm condition. As a result, the standard "backing store" feature of typical windows-based operating systems (in which the pixel data in the obscured section are simply saved in memory during the appearance of obscuring item 77 and used to redraw the section when item 77 is removed) is not relied upon in system 10. Instead, after item 77 is removed objects A and B are updated in display area 22 using the data in data structures 30 (which reflects changes in the position, size, and display characteristics of objects A and B that have occurred). As discussed below, bit masks 56, 58 are used to confine the amount of redrawing to only the regions 54 of display area 22 that have been affected by the display event.

As shown in FIG. 4, when obscuring item 77 is removed, operating system 20 informs application program 16 of the section of the display that has become "dirty" (i.e., needs updating to fill in the space formerly occupied by item 77). This is done by passing a "bounding rectangle" that encloses item 77 to applications program 16 (step 78). Applications program 16 uses the bounding rectangle to determine which regions 54 of display area 22 correspond to the "dirty" section, and constructs (step 80) an initial change mask 82 that identifies the dirty regions 54.

Figure 7:
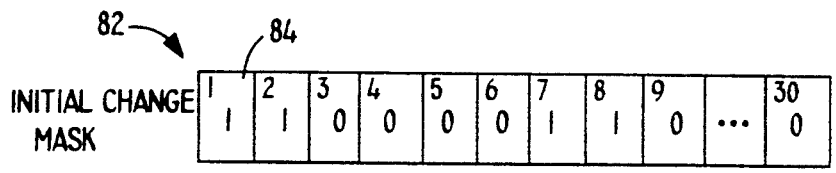
FIG. 7 shows a bit mask used in responding to the display event of FIG. 6.

FIG. 7 shows initial change mask 82. Like bit masks 56-64, initial change mask 82 has one entry 84 for each of the thirty regions 54 in area 22. The logic states of the bits in mask 82 are set, or not, based on whether the regions 54 to which they correspond is dirty. In this example, because regions 1, 2, 7, and 8 were occupied by obscuring item 77, these bits of initial change mask 82 are set to logic "1" states, with the remaining bits of mask 82 being in a logic "0" state. Initial change mask 82 is used to cause objects A and B to be updated, as discussed in detail below.

An initial change mask is also generated in response to display events 75 that involve a change in the display position or characteristics of objects A-E, but in a somewhat different manner than that discussed above. The procedure followed after the initial change masks are generated in response to events 74, 75 are virtually identical, and thus will be discussed following a description of how the initial change mask is generated in response to display changes in objects A-E.

During the execution of application program 16, a "recalc" message is periodically sent to each object A-E, directing objects A-E to check the real time database for changes in its data (step 86). This is the first step in enabling the display to be refreshed in response to changes in the graphical data. If none of objects A-E have changed (step 88) since the previous recalc message, no change is made is the display of objects A-E, and the objects await the next recalc command (step 86).

Figure 8:
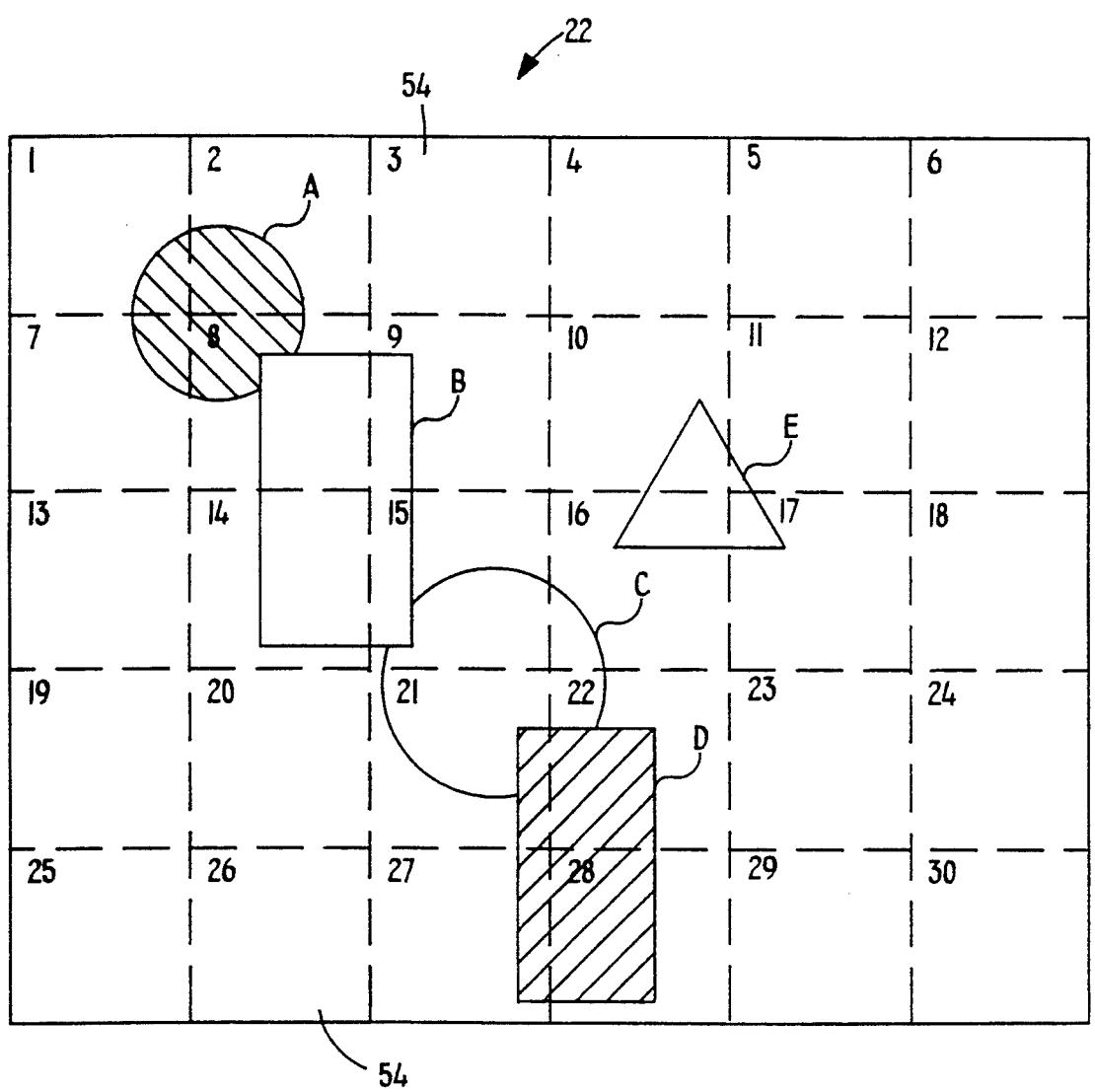
FIG. 8 represents another type of display event that triggers updating of displayed objects in the invention.
Figure 9:
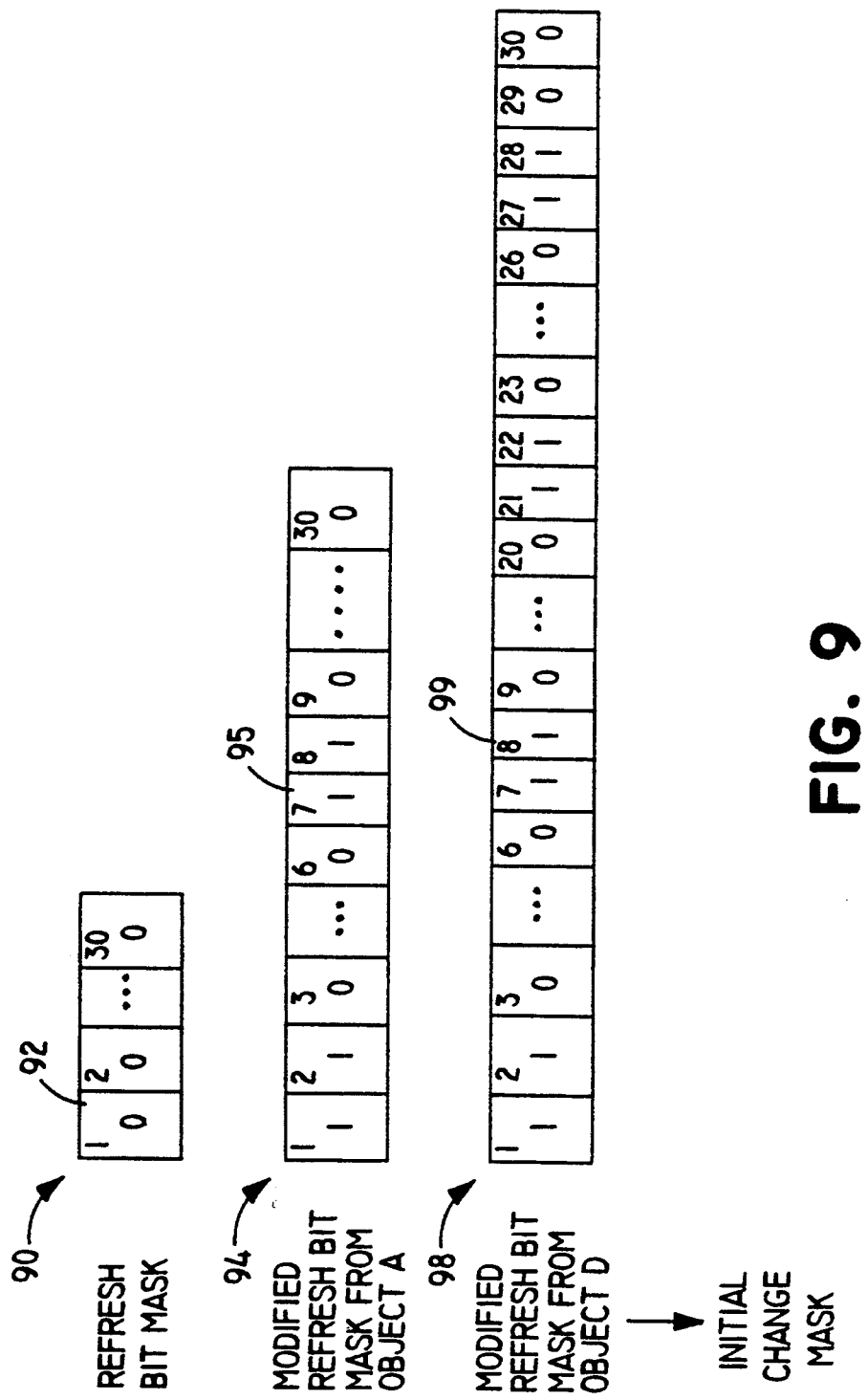
FIG. 9 shows bit masks used in responding to the display event of FIG. 8.

Referring also to FIGS. 8 and 9, assume that objects A and D have changed in some way since the previous recalc message (e.g., their color has changed, as indicated by the shading in FIG. 8). Each time application program 16 sends a recalc message, it also supplies to list data structure 32 a refresh bit mask 90 that includes an entry 92 each of which corresponds to one of the thirty regions 54 in display area 22 and contains a logic "0". List data structure 32 passes bit mask 90 to objects A-E in the order in which the objects are stacked in area 22 (i.e., objects A, C, E, B, D).

Each of objects A-E that detects that it has changed performs a logic OR operation between its bit mask and refresh bit mask 90, and passes the resultant mask to the next object A-E, as directed by list data structure 32. Objects that detect no change in themselves simply pass the mask that they receive to the next object. For example, bit mask 90 is passed to data object A first. Object A logically ORs entries 66 of its bit mask 56 with the corresponding entries 92 of bit mask 90 to produce a modified refresh bit mask 94 (step 96). Modified mask 94 includes logic "1"s in the entries that correspond to the regions occupied by object A (i.e., bits 1, 2, 7, and 8 are in the logic "1" state) and logic "0"s in the remaining entries.

The remaining objects are stacked in the following order: object C, object E, object B, and object D. As a result, objects C, E, and B each receive modified refresh bit mask 94 and pass it along unchanged, because their data have not changed in this example. When object D receives refresh bit mask 94, it logically ORs the entries of its bit mask 62 with entries 95 of mask 94. The resultant mask 98 includes logic "1"s in entries 21, 22, 27, and 28, in addition to the logic "1"s from entries 1, 2, 7, and 8 of mask 94. Because object D is the final object in the chain, it returns mask 98 to application program 16 (via list object 32) as the initial change mask to be used in updating objects A and D in display area 22 (step 100).

After each object A, D that has changed performs the logic OR operation using its bit mask 56, 62, it begins preparing to redraw itself (step 97) in anticipation of a "repaint" command that application program 16 will send in response to receiving an initial change mask 98 that includes a logic "1" in any of its entries 99. This reduces the time needed for objects A, D to redraw themselves when the repaint command is issued. Thus, objects A and D recalculate their dynamic properties, such as color, x-y location, and x-y scale. In addition, some objects (such as object D) can be "filled" by various amounts, for example to resemble a the level of fluid in a container. The filling level is also a dynamic property that is changed in step 97.

As shown in FIG. 4, the steps taken to update the information displayed in area 22 after application program 16 generates initial change mask 82 (step 80) or initial change mask 98 (step 100) are identical. Application program 16 first activates work area 38 in display memory 36 that supports display area 22 (step 102). Work area 38 is an "offscreen memory" for buffer 42 and display 12. That is, data stored in buffer 42 is always applied to and displayed on device 12. By contrast, work area 38 serves as an intermediate, scratchpad memory into which data from objects A-E are written in their entirety when display 12 is to be updated, and only selected portions of the data written into work area 38 are transferred into buffer 42 for display, as described in detail below.

Application program 16 then sends the repaint command and the applicable initial change mask (82 or 98) to data structures 30 for all objects A-E via list object data structure 32 (step 104). List data structure 32 sequentially sends the repaint command and initial change mask 82, 98 to object data structures 30 in the order that objects A-E are to redraw themselves (list data structure 32 assumes that all objects A-E will redraw themselves). Each object data structure 30 then performs a logical AND operation between the entries of its bit mask 56-64 and the corresponding entries of initial change mask 82 or 98 (step 106).

For each object A-E, if the result of the AND operation is a logic "1" for any of the thirty entries, the object determines that it must be redrawn (step 108). The AND operation is performed in one step for each object A-E (by applying the masks to a 32 bit logic comparator), thereby enabling each object A-E to rapidly make this determination. Each object A-E that finds a match between a logic "1" state in any of the entries of its bit mask 56-64 and a logic "1" in a corresponding entry of initial change mask 82 or 98 redraws itself in its entirety into work area 38 (step 108).

Figure 10:
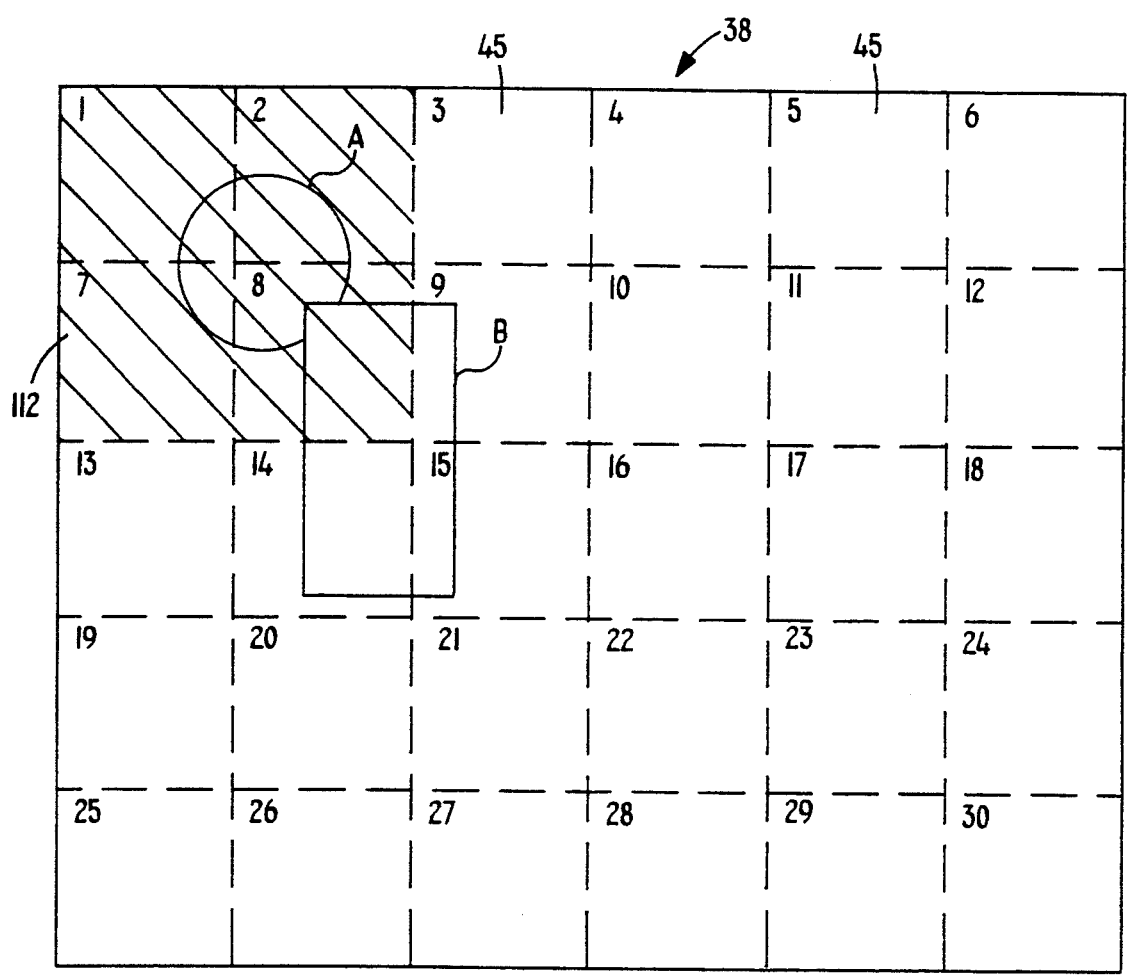
FIG. 10 illustrates a "stencil" which contains a clipping region defining the regions of the display area that are updated in response to the display event of FIG. 6.

Referring also to FIG. 10, work area 38 is partitioned into regions 45 each of which corresponds to a region 54 of display area 22. Thus, work area 38 includes thirty equal size regions 45 arranged in a 6×5 array. When an object A-E redraws itself into work area 38, it writes its pixel data into the same regions 45 (and thus the same pixel locations) as it would if the object were to redraw itself directly in regions 54 of display area 22.

In the case of display event 74 (i.e., the display and subsequent removal of obscuring item 77), objects A and B determine during step 106 that they must be redrawn (because their AND operations reveal a logic "1" match between the entries of their bit masks 56, 58 and those of initial change mask 82). More specifically, object A finds a logic "1" match with initial change mask 82 for entries 1, 2, 7, and 8 of its bit mask 56, while entry 8 of object B bit mask 58 yields a logic "1" match with corresponding entry 8 of initial change mask 82. None of the other objects C–E find a logic "1" match during the AND operation. Thus, as shown in FIG. 10, only objects A and B redraw themselves into work area 38, and they do so in the same pixel locations as if they were redrawing themselves in display area 22 rather than in offscreen memory.

Figure 11:
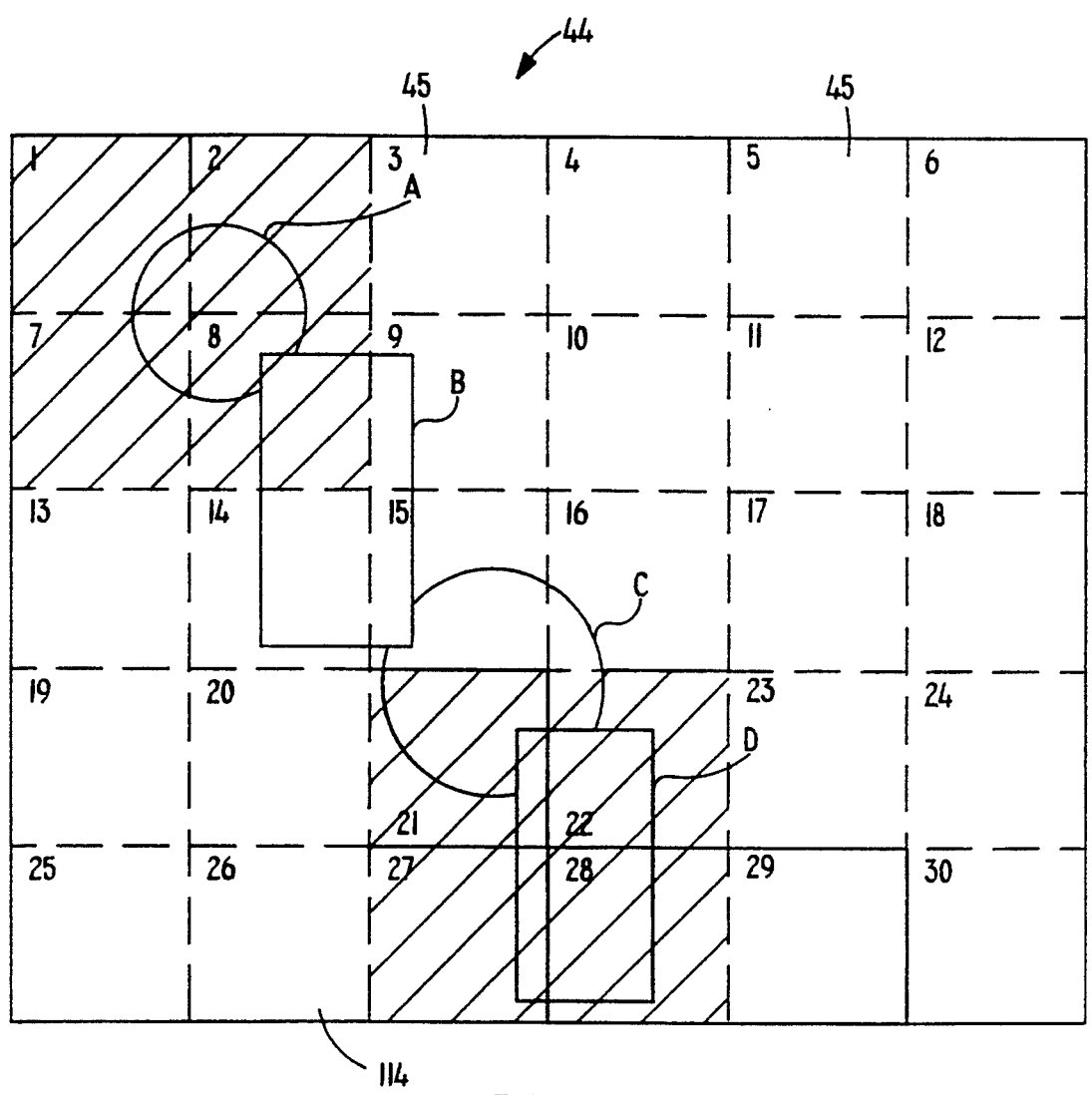
FIG. 11 shows a "stencil" which contains multiple, disjoint clipping regions defining the regions of the display area that are updated in response to the display event of FIG. 8.

As shown in FIG. 11, a different result is achieved in response to display event 75 (i.e., a change in the display characteristics of objects A and D). In this case, the AND operations performed during step 108 reveal that objects A, B, C, and D all occupy regions identified with logic "1"s in initial change mask 98. Specifically, a logic "1" match is found with the states of entries 99 of initial change mask 98 as follows:

Object A: Bit mask 56 entries 1, 2, 7, 8
Object B: Bit mask 58 entry 8
Object C: Bit mask 60 entries 21, 22
Object D: Bit mask 62 entries 21, 22, 27, 28

Note that the AND operation performed on the entries of object E bit mask 64 yields no logic "1" match with the entries of initial change mask 98. Thus, objects A, B, C, and D are redrawn in their entirety into work area 38, and object E is not redrawn at all, even though it occupies the same region 54 (region 16) in display area as object C. As will become apparent, one reason for this is that neither the portion of object C that occupies region 16 nor any other portion of region 16 of work area 38 is not transferred to buffer 42 or display area 22.

Note that because list data structure 32 causes the repaint message and initial change mask 82, 98 to be passed to objects A–E in the order in which objects A–E are to redraw themselves, the redrawn objects are stacked correctly in work area 38. For example, rectangular object B is redrawn after circular object A (FIG. 10, and after circular object C as well in FIG. 11) so as to appear in front of object A (and object C). Likewise, object D (FIG. 11) is redrawn after object C so as to appear to overly object C.

When all objects A–E that need redrawing have finished writing their pixel data into work area 38, list data structure 32 passes control back to application program 16. To minimize the amount of data that will be transferred to display area 22 (and hence the amount of time needed to update objects A–E on display device 12), application 16 writes pixel data from only regions 45 of work area 38 for which the entries of initial change mask 82, 98 are set to logic "1". That is, objects A–E are updated by transferring regions 45 of pixel data—rather than entire objects A–E—from work area 38 to display area 22 (via buffer 42). Application 16 essentially constructs a "stencil," based on the logic states of the entries of initial change mask 82, 98 (step 110), that includes only those regions 45 of work area 38 that correspond to regions 54 of display area 22 that will be updated in response to display events 74, 75. The stencil thus defines a clipping region that limits the amount of data that will be written into buffer 42 and transferred to display area 22.

For example, referring to FIGS. 7 and 10, the logic "1" states of entries 1, 2, 7, and 8 in initial change mask 82 identify that only regions 1, 2, 7, and 8 of display area 22 need to be updated in response to the display and removal of obscuring item 77 (FIG. 6). Thus, the stencil 112 (FIG. 10) constructed in response to initial change mask 82 in step 110 defines a clipping region that includes only regions 1, 2, 7, and 8 of work area 38. The remaining regions (3–6 and 9–30) of work area 38 are omitted from stencil 112, because the corresponding regions 54 of display area 22 were not obscured by information item 77 and thus need not be updated.

Referring to FIGS. 8, 9, and 11, the stencil 114 constructed in response to display event 75 and initial change mask 98 includes two disjoint rectangular areas of work area 38 that encompass regions 1, 2, 7, and 8 and regions 21, 22, 27, and 28, respectively. (This feature is supported by Windows 3.1 operating system 20.) These regions, and no others, are included in the clipping regions defined by stencil 114 because they correspond to entries 99 of initial change mask 98 that are set to a logic "1".

Application program 16 then reads all pixel data from work area 38 in a single call, but writes only the pixel data that is included in the clipping region defined by the stencil into buffer 42 (step 116). Applicants have found that this is faster than reading data from work area 38 in a series of calls each of which is limited to data residing in a single region 45. Finally, processor 14 writes the data in buffer 42 into display area 22 (step 118).

Referring to FIG. 10, pixel data is read from all regions 45 of work area 38 in one call, but only the data located in regions 1, 2, 7, and 8 (i.e., the clipping region defined by stencil 112) is actually written into buffer 42 for display. Note that the portions of object B that are located in regions 9, 14, and 15 are not transferred to buffer 42, even though these portions were rewritten in response to display event 74, because these portions of object B were not obscured. Because applicants' technique for updating display area 22 transcends the boundaries of objects A–E, the display is updated much more rapidly than in schemes in which entire objects are updated, even if only a portion of the objects require it.

In the example shown in FIG. 11, all of the pixel data stored in work area 38 is read in a single call, but application program 16 uses the disjoint clipping regions defined by stencil 114 to allow only the data from regions 1, 2, 7, 8, 21, 22, 27, and 28 to be written into buffer 42. It will be noted that objects A and D (the objects whose characteristics changed in display event 75) are transferred in their entirety, but only portions of objects B and C are written into buffer 42.

The microfiche appendix of source code embodies the procedure for updating displayed data objects described and claimed in this application, and is incorporated herein by reference. It may be implemented on any computer (such as an Intel DOS-based computer, a Digital Equipment Corporation VAX-based computer, etc.) that operates using any suitable operating system which includes a multitasking operating system, e.g., Windows 3.1. In addition, any suitable ANSI-standard C-compiler, object linker, and library manager can be used.

Other embodiments are within the scope of the following claims.

For example, the use of thirty equal size regions in a 6×5 array is illustrative. Other array configurations (e.g., 8×8) can be used instead.

In addition, while data objects A–H have been illustrated as having dynamic properties, this is not required to practice the invention.

A portion of the disclosure of this patent document contains material which is subject to copyright protection. The copyright owner has no objection to the facsimile reproduction by anyone of the patent document or patent disclosure, as it appears in the Patent and Trademark Office file or records, but otherwise reserves all copyright rights whatsoever.

What is claimed is:

1. A computer-implemented method for displaying information that includes one or more objects, comprising representing a display area as an array of regions and maintaining, for each displayed object, a record that identifies the regions that said object occupies in said display area, each said record including a plurality of entries each of which corresponds to one of said regions, assigning to each of said entries a state that indicates whether the object for which the record is maintained occupies the region to which the entry corresponds, responding to an event that causes a change in the information presented in the display area by detecting which of said regions are affected by the change, and establishing an event record of entries each of which has a state that indicates whether the region to which the entry corresponds is an affected region, comparing the states of the entries of the record maintained for each said object with the states of the entries of the event record to determine whether said object occupies at least one of said affected regions, and determining to update a displayed object if said record for said object identifies at least one of said affected regions.

2. The method of claim 1 wherein said comparing step includes performing a logic AND operation on the states of corresponding entries of said records to determine whether said object occupies at least one of said affected regions.

3. A computer-implemented method for displaying information that includes one or more objects, comprising representing a display area as an array of regions and maintaining, for each displayed object, a record that identifies the regions that said object occupies in said display area, responding to an event that causes a change in the information presented in the display area by detecting which of said regions are affected by the change, determining to update a displayed object if said record for said object identifies at least one of said affected regions, updating a said object in response to said event by drawing said object into a storage area by writing data that represents said object into regions of said storage area that correspond to said array of regions in said display area, and selectively transferring said data from one or more of said storage area regions to corresponding said regions in said display area, said step of selectively transferring includes establishing an event record that identifies said affected regions, comparing, for each said object, the record maintained for said object with said event record to determine whether said object occupies at least one of said affected regions, and, if so, writing said data that represents said object into said storage area, and transferring said data only from said regions of said storage area that correspond to said affected regions identified by said event record to said display area.

4. The method of claim 3 further comprising obtaining said data to be selectively transferred to said display area in a single call to said storage area.

5. The method of claim 3 further comprising constructing at least one clipping region based on said event record, and applying said clipping region to the said data cause only the data that is to be displayed in the affected regions to be transferred to said display area.

6. A computer-implemented method for displaying information that includes one or more objects, comprising representing a display area as an array of regions, maintaining, for each displayed object, a record that identifies the regions that said object occupies in said display area, said record including a plurality of entries each of which corresponds to one of said regions and has a state that indicates whether the object for which the record is maintained occupies the region to which the entry corresponds, responding to an event that causes a change in the information presented in the display area by establishing an event record of entries each of which has a state that indicates whether the region to which the entry corresponds is affected by the change, and comparing the states of the entries of the record maintained for each said object with the states of the entries of the event record to determine whether said object occupies at least one of said affected regions and, if so, updating said object in said display area at least insofar as said object occupies a said affected region.

7. The method of claim 6 further comprising updating in said display area only portions of said object that occupy a said affected region.

8. Apparatus for displaying information that includes one or more objects on a display device of a computer, comprising means for representing a display area on said device as an array of regions and maintaining, for each displayed object, a record that identifies the regions that said object occupies in said display area, each said record including a plurality of entries each of which corresponds to one of said regions, means for assigning to each of said entries a state that indicates whether the object for which the record is maintained occupies the region to which the entry corresponds, means for responding to an event that causes a change in the information presented in the display area by detecting which of said regions are affected by the change, said means for responding to said event including means for establishing an event record of entries each of which has a state that indicates whether the region to which the entry corresponds is an affected region, and means for comparing the states of the entries of the record maintained for each said object with the states of the entries of the event record to determine whether said object occupies at least one of said affected regions, and means for determining to update a displayed object if said record for said object identifies at least one of said affected regions.

9. The apparatus of claim 8 wherein said comparing means performs a logic AND operation on the states of corresponding entries of said records to determine whether said object occupies at least one of said affected regions.

10. Apparatus for displaying information that includes one or more objects on a display device of a computer, comprising means for representing a display area on said device as an array of regions and maintaining, for each displayed object, a record that identifies the regions that said object occupies in said display area, means for responding to an event that causes a change in the information presented in the display area by detecting which of said regions are affected by the change, means for determining to update a displayed object if said record for said object identifies at least one of said affected regions, and means for updating a said object in response to said event by drawing said object into a storage area by writing data that represents said object into regions of said storage area that correspond to said array of regions in said display area, and selectively transferring said data from one or more of said storage area regions to corresponding said regions in said display area, said means for updating including means for establishing an event record that identifies said affected regions, means for comparing, for each said object, the record maintained for said object with said event record to determine whether said object occupies at least one of said affected regions, and, if so, writing said data that represents said object into said storage area, and means for transferring said data only from said regions of said storage area that correspond to said affected regions identified by said event record to said display area.

11. The apparatus of claim 10 further comprising means for obtaining said data to be selectively transferred to said display area in a single call to said storage area.

12. The apparatus of claim 10 further comprising
means for constructing at least one clipping region based on said event record, and means for applying said clipping region to the said data cause only the data that is to be displayed in the affected regions to be transferred to said display area.

13. Apparatus for displaying information that includes one or more objects on a display device of a computer, comprising means for representing a display area of said display device as an array of regions, means for maintaining, for each displayed object, a record that identifies the regions that said object occupies in said display area, said record including a plurality of entries each of which corresponds to one of said regions and has a state that indicates whether the object for which the record is maintained occupies the region to which the entry corresponds, means for responding to an event that causes a change in the information presented in the display area by establishing an event record of entries each of which has a state that indicates whether the region to which the entry corresponds is affected by the change, means for comparing the states of the entries of the record maintained for each said object with the states of the entries of the event record to determine whether said object occupies at least one of said affected regions, and means for updating said object in said display area at least insofar as said object occupies a said affected region based on said comparing.

14. The apparatus of claim 13 wherein said means for updating updates in said display area only portions of said object that occupy a said affected region.

* * * * *